US011390204B1

(12) United States Patent
Jenab et al.

(10) Patent No.: US 11,390,204 B1
(45) Date of Patent: Jul. 19, 2022

(54) PASSENGER ASSIST STRAP

(71) Applicant: Amatrimara Inc., Oakville, CA (US)

(72) Inventors: Arash Jenab, Hamilton, CA (US);
Michael Klinck, Oakville, CA (US);
Scott Strong, Oakville, CA (US)

(73) Assignee: Amatrimara Inc., Oakville (CA)

( * ) Notice: Subject to any disclaimer, the term of this patent is extended or adjusted under 35 U.S.C. 154(b) by 0 days.

(21) Appl. No.: 17/172,400

(22) Filed: Feb. 10, 2021

(51) Int. Cl.
*B60N 3/02* (2006.01)

(52) U.S. Cl.
CPC .................................. *B60N 3/026* (2013.01)

(58) Field of Classification Search
CPC .................................. B60N 3/026; B60N 3/02
See application file for complete search history.

(56) References Cited

U.S. PATENT DOCUMENTS

| | | | | |
|---|---|---|---|---|
| 453,083 A * | 5/1891 | Johnson | .................... | B60N 3/02 |
| 729,696 A * | 6/1903 | Swift | ....................... | B60N 3/02 |
| 1,007,019 A * | 10/1911 | Wright | ...................... | B60N 3/02 |
| | | | | 105/354 |
| 1,065,930 A * | 7/1913 | Farmer | ..................... | B60N 3/02 |
| | | | | 105/354 |
| 1,112,157 A * | 9/1914 | Newton | ................... | B60N 3/02 |
| | | | | 105/354 |
| 1,177,258 A * | 3/1916 | Mott | ........................ | B60N 3/02 |
| | | | | 105/354 |
| 1,311,075 A * | 7/1919 | Johnson | ................... | B60N 3/02 |
| | | | | 105/354 |
| 1,893,807 A * | 1/1933 | Rubin | ...................... | B60N 3/02 |
| | | | | 105/354 |
| 2,203,340 A * | 6/1940 | Prance | ................... | B61D 49/00 |
| | | | | 105/354 |
| 2,241,504 A * | 5/1941 | Claud-Mantle | ........ | B60N 3/026 |
| | | | | 105/354 |
| 2,260,124 A * | 10/1941 | Prance | ................... | B61D 49/00 |
| | | | | 105/354 |

(Continued)

FOREIGN PATENT DOCUMENTS

WO WO-2008/089991 A1 * 7/2008 ............. B60N 3/026

*Primary Examiner* — Jason S Morrow
(74) *Attorney, Agent, or Firm* — BakerHostetler

(57) ABSTRACT

This present invention relates to transportation and more particularly to a passenger assist strap and clamp for a vehicle, such as, a bus, shuttle, or subway. The passenger assist strap comprises a strap with a tuck loop at a first end and a pin at a second end and the strap forms a top loop starting at the first end and a bottom loop ending at the second end wherein the middle portion of the strap between the top loop and bottom loop is sandwiched in between the first end and the second end and the tuck loop loops over the second end under the pin. The strap may be a double layer of strap and the tuck loop and pin may be positioned in folds of the strap. The clamp has a male clamp and a female clamp with attachment means to attach the male clamp to the female clamp. To attach the clamp to the passenger assist strap, the male clamp is positioned over the first end of the strap and the female clamp is positioned over the second end of the strap, and wherein the female clamp has female clamp sides each with a V-shaped groove comprised of an upper pin groove along which the end portions of the pin slide into and a lower tuck loop groove along which the tuck loop slides into.

6 Claims, 9 Drawing Sheets

(56) References Cited

U.S. PATENT DOCUMENTS

| | | | | |
|---|---|---|---|---|
| 2,288,708 | A | * | 7/1942 | Hinz ...................... B60N 3/026 105/354 |
| D796,417 | S | * | 9/2017 | Klinck ........................ D12/400 |
| 10,414,315 | B2 | | 9/2019 | Strong et al. |
| 2005/0132622 | A1 | * | 6/2005 | Strong ...................... G09F 3/08 40/318 |
| 2006/0075607 | A1 | * | 4/2006 | Goulden ................ B60N 3/026 16/444 |
| 2008/0235914 | A1 | * | 10/2008 | Dolberg ................ B60N 3/026 16/430 |
| 2009/0134613 | A1 | * | 5/2009 | Eber ...................... B60N 3/026 280/748 |
| 2020/0406801 | A1 | * | 12/2020 | Yamanouchi .......... B60N 3/026 |

\* cited by examiner

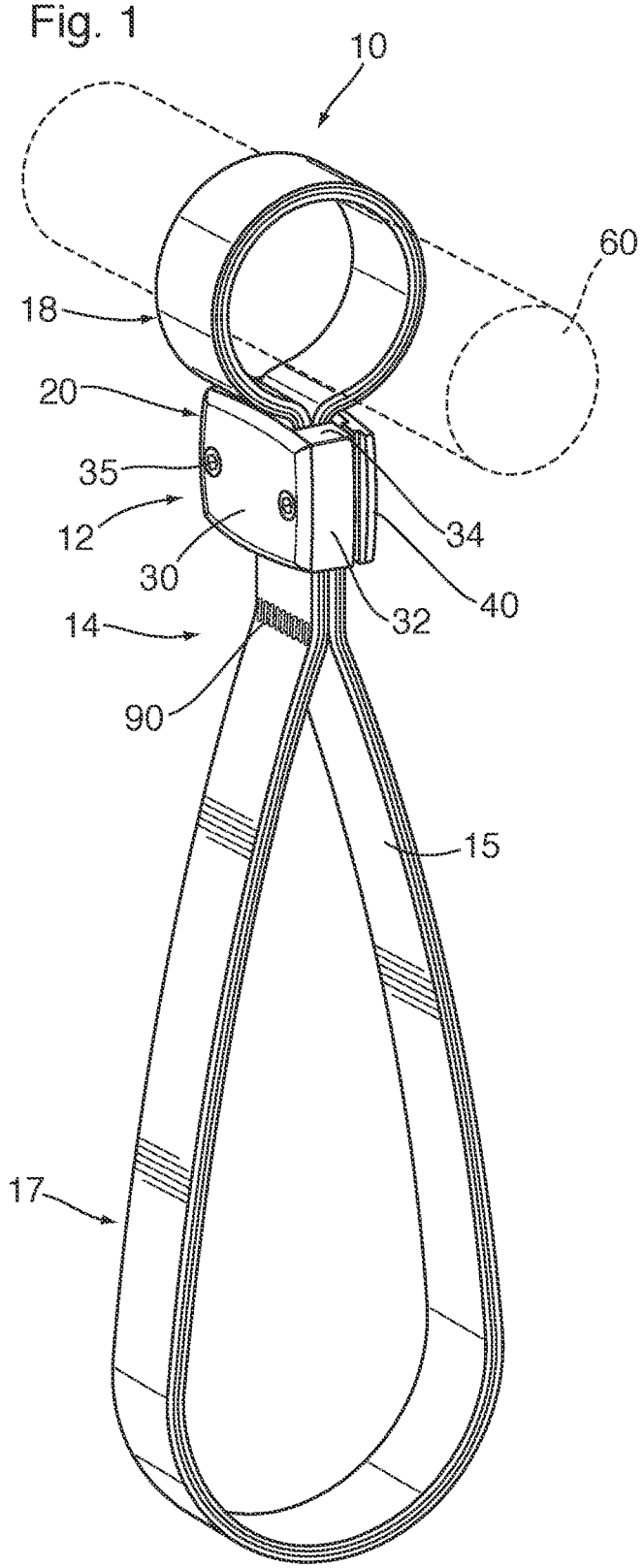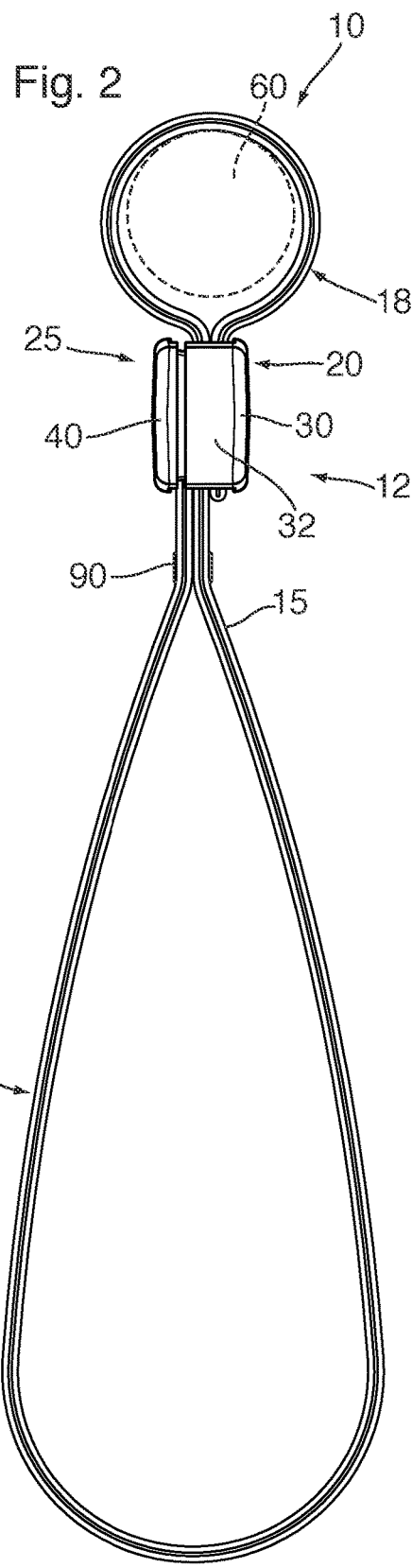

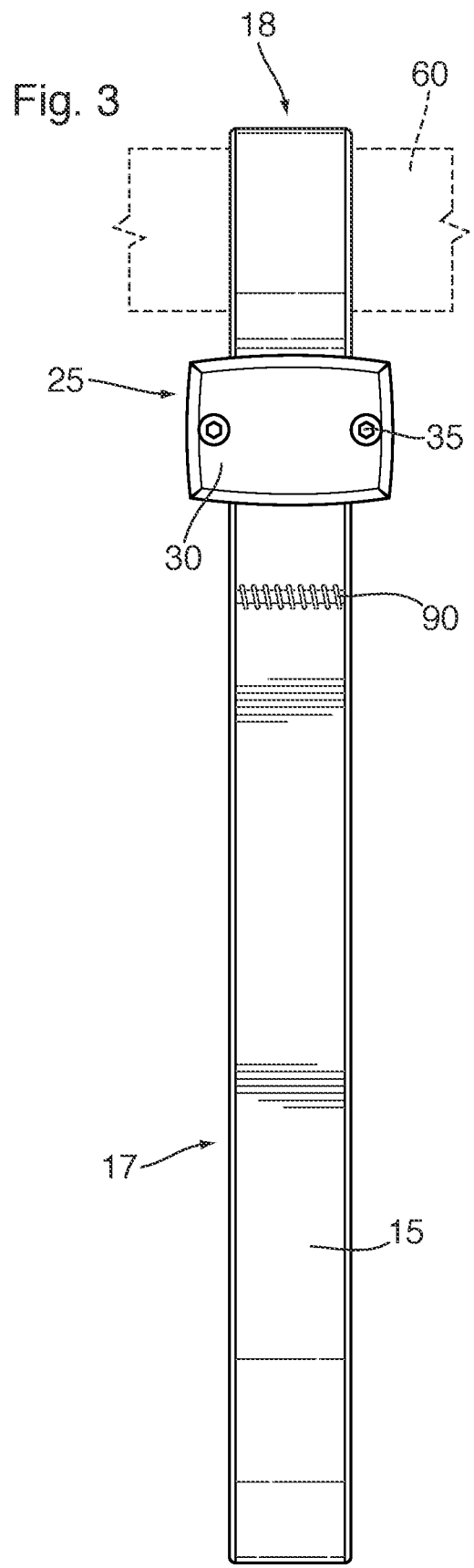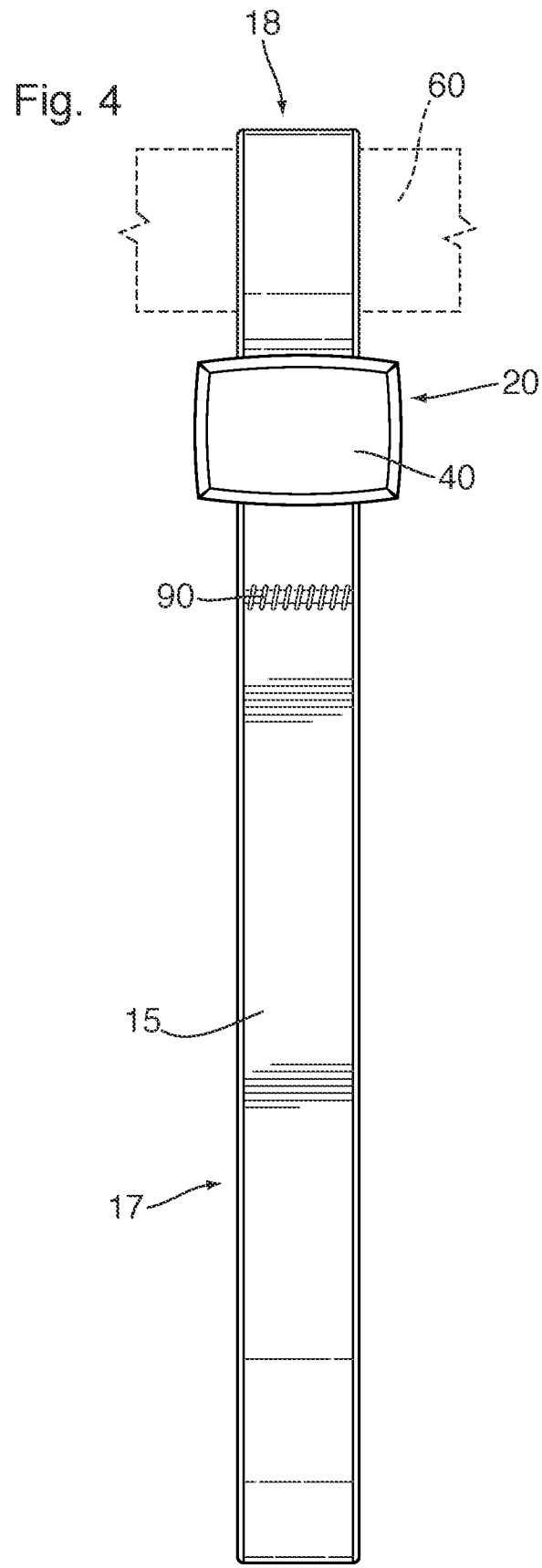

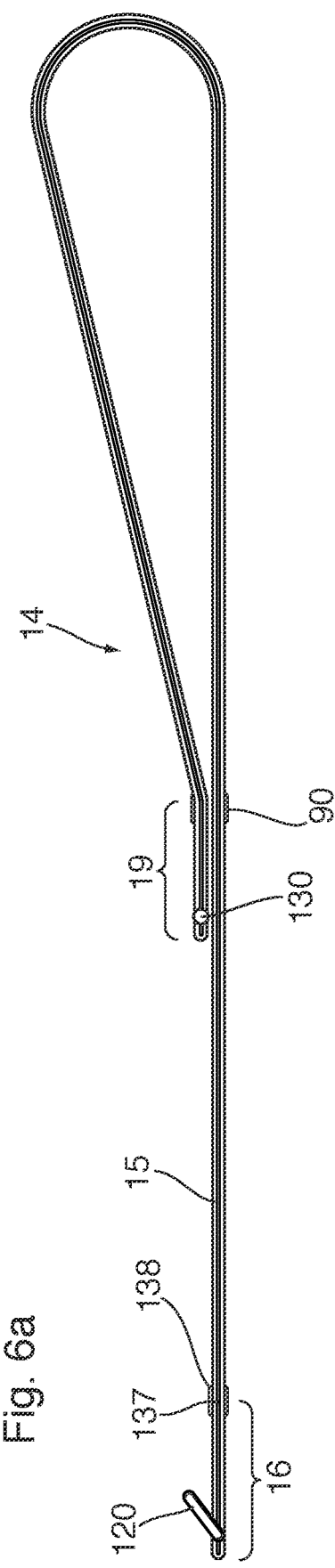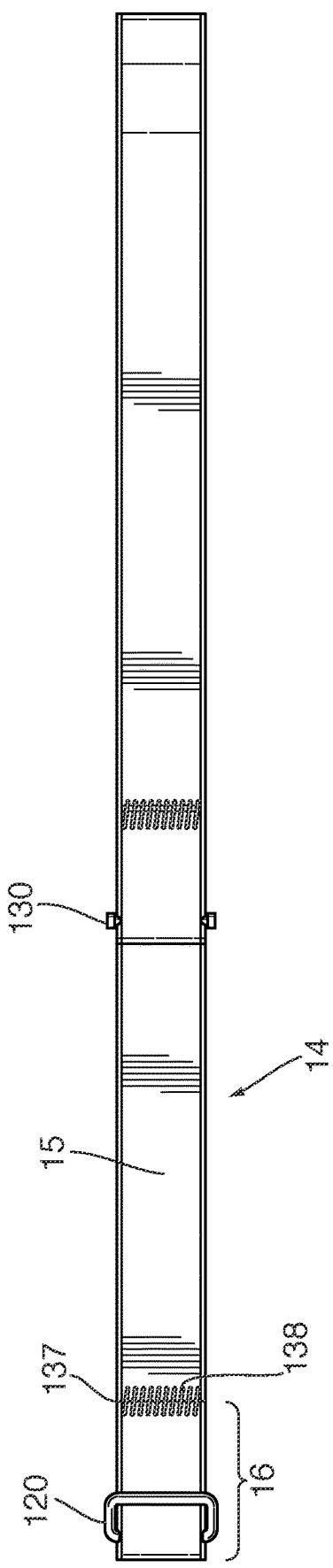

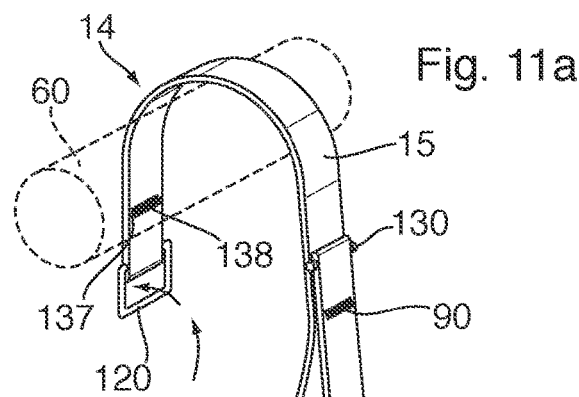
Fig. 11a
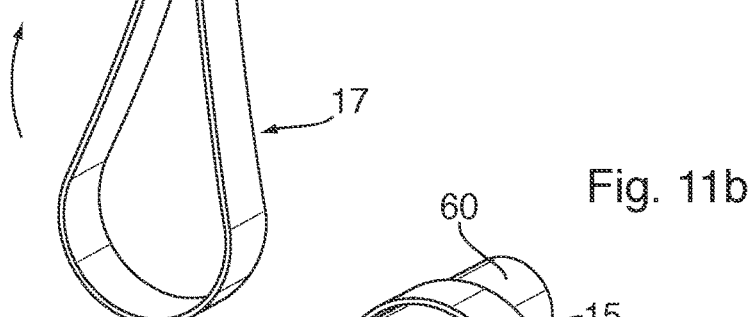
Fig. 11b
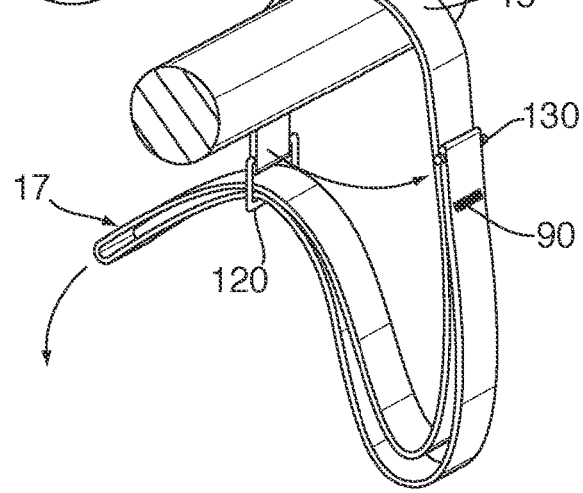
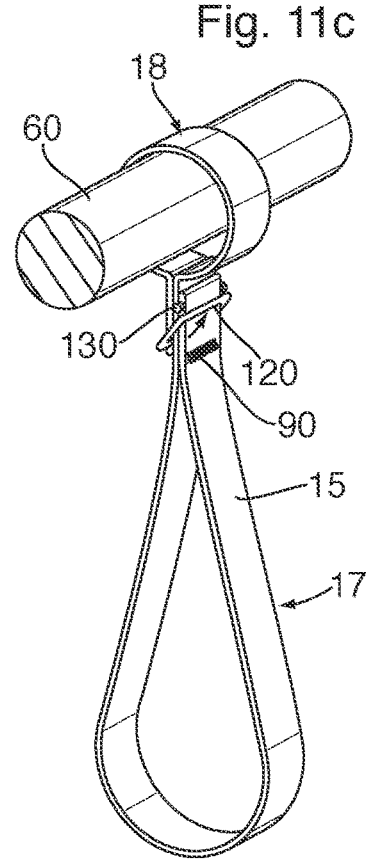
Fig. 11c

PASSENGER ASSIST STRAP

FIELD OF INVENTION

This invention relates to passenger assist straps and more particularly to a passenger assist strap with a strap having a tuck loop and pin and corresponding clamp.

BACKGROUND OF THE INVENTION

Passenger assist straps comprised of thermoplastic, webbing, fabric, leather, or a combination of these materials, are installed within many public transit vehicles, for example, buses, subways/metros and passenger trains. The passenger assist straps are traditionally installed on the horizontal overhead stanchions that run parallel to the aisle ways. Passengers can grasp the passenger assist straps to steady themselves while standing within the public transit vehicle.

The strap of a passenger assist strap may be folded in such a way as to create a top loop which can encircle a horizontal overhead handrail, and a larger bottom loop which passengers can grasp. The passenger assist strap can be held together with a machine screw or a clamp located at a portion of the assist strap between the top and bottom loops. There are three layers of strap material where the ends of the strap are secured together to form the top and bottom loops; the first end of the strap forms an outside layer on either side of the top loop, and the second end of the strap is the middle layer in between the outer layers.

The three layers of the strap of the passenger assist strap may be held together by attachment means consisting of a machine screw passing through the three layers of strap material, and in addition may include two washers, a T-nut, and an acorn nut. As the machine screw is tightened into the T-nut, the three layers of strap material are squeezed together.

One disadvantage of relying on a machine screw is that it can become loose, either through vibrations or tampering, and fall off a stanchion. U.S. Pat. No. 10,414,315 provides an interlocking strap clamp to reduce the disadvantages of a machine screw type attachment means.

While an interlocking clamp decreases the likelihood of a strap falling off a stanchion from vibrations or tampering, such clamps (and machine screws) still require straps made of a material through which a hole may be punched in order to secure the clamp (or machine screw). On the other hand, it is desirable to have a strap made of very strong material to avoid breakage or deformation, but such material is difficult to punch a hole through.

What is needed is a secure passenger assist strap, and a clamp that is capable of securing onto the strap without punching a hole through the strap.

SUMMARY OF INVENTION

In an embodiment of the present invention, there is provided a passenger assist strap comprising a tuck loop, a pin having a first end portion and a second end portion, and a strap having a first end and a second end, wherein the tuck loop is attached to the strap at the first end and the pin is attached to the strap at the second end such that the end portions of the pin extend beyond a width of the strap.

The strap of the passenger assist strap may be folded to bring the second end of the strap adjacent a middle portion between the first end and the second end of the strap to form a bottom loop. Thereafter the bottom loop may be threaded through the tuck loop until the tuck loop abuts against the end portions of the pin.

The strap of the passenger assist strap may be folded to bring the second end of the strap adjacent a middle portion between the first end and the second end of the strap to form a bottom loop and the strap sewn to the middle portion of the strap to maintain the second end of the strap adjacent to the upper middle portion of the strap and then the bottom loop may be threaded through the tuck loop until the tuck loop abuts against the end portions of the pin.

The strap of the passenger assist strap may be comprised of a length of strap folded over to create a double thickness of strap, and the tuck loop is attached to the strap by the length of strap folding over the tuck loop, and the pin is attached to the strap by the length of the strap folding over the pin, and the double thickness of strap is secured together. The strap is thereafter folded to bring the second end of the strap adjacent a middle portion between the first end and the second end of the strap and sewn together to form a bottom loop. The bottom loop is thereafter threaded through the tuck loop until the tuck loop abuts against the end portions of the pin.

In an embodiment of the present invention, there is provided a clamp for a passenger assist strap comprising an interlocking male clamp and a female clamp with attachment means to attach the male clamp to the female clamp, wherein the female clamp has female clamp sides each with a V-shaped groove comprising an upper groove and a lower groove.

In an embodiment of the present invention, there is provided a passenger assist strap and clamp comprising a passenger assist strap and a clamp, wherein the passenger assist strap comprises a tuck loop, a pin having a first end portion and a second end portion, and a strap having a first end and a second end, the tuck loop is attached to the strap at the first end and the pin is attached to the strap at the second end such that the end portions of the pin extend beyond a width of the strap, the strap is folded to bring the second end of the strap adjacent a middle portion between the first end and the second end of the strap to form a bottom loop, and the bottom loop is threaded through the tuck loop until the tuck loop abuts against the end portions of the pin, and wherein the clamp comprises an interlocking male clamp and a female clamp, and wherein the male clamp attaches to the female clamp by attachment means to securely attach the clamp to the passenger assist strap such that the female clamp covers the strap where the tuck loop abuts against the end portions of the pin.

The female clamp may additionally have female clamp sides each with a V-shaped groove comprising an upper pin groove along which the end portions of the pin slide into and a lower tuck loop groove along which the tuck loop slides into.

The attachment means of the passenger assist strap and clamp may comprise holes in male clamp, ports in the female clamp sides and screws which pass through the holes and screw into the ports and which screws do not pass through the strap.

The male clamp of the passenger assist strap and clamp may additionally comprise male clamp sides which cover the female clamp sides.

The strap of the passenger assist strap and clamp may be comprised of more than one layer of strap.

The passenger assist strap of the passenger assist strap and clamp may be comprised of a length of strap folded over to create a double thickness of strap, and the tuck loop is attached to the strap by the length of strap folding over the tuck loop, and the pin is attached to the strap by the length of the strap folding over the pin, and the double thickness of strap is secured together.

DESCRIPTION OF DRAWINGS

These and other aspects of the present invention will be apparent from the brief description of the drawings and the following detailed description in which:

FIG. 1 is a front left perspective view of a passenger assist strap and clamp of an embodiment of the present invention.

FIG. 2 is a right-side view of the passenger assist strap and clamp of FIG. 1.

FIG. 3 is a front view of the passenger assist strap and clamp of FIG. 1.

FIG. 4 is a back view of the passenger assist strap and clamp of FIG. 1.

FIG. 6a is a left-side view of a passenger assist strap of an embodiment of the present invention with a bottom loop.

FIG. 6b is a back view of the passenger assist strap of FIG. 6b.

FIG. 8b is a cross sectional view of the clamp along the line 8b-8b of FIG. 8a.

FIG. 8c is a cross sectional view of the clamp along the line 8c-8c of FIG. 8a.

FIG. 9b is a cross sectional view of the clamp along the line 9b-9b of FIG. 9a.

FIG. 9c is a cross sectional view of the clamp along the line 9c-9c of FIG. 9a.

FIG. 10b is a cross sectional view of the clamp along the line 10b-10b of FIG. 10a.

FIG. 10c is a cross sectional view of the clamp along the line of 10c-10c of FIG. 10a.

FIGS. 11a to 11c are perspective views of the installation of a passenger assist strap and clamp of the present invention on a stanchion.

DETAILED DESCRIPTION OF INVENTION

Figure 5:
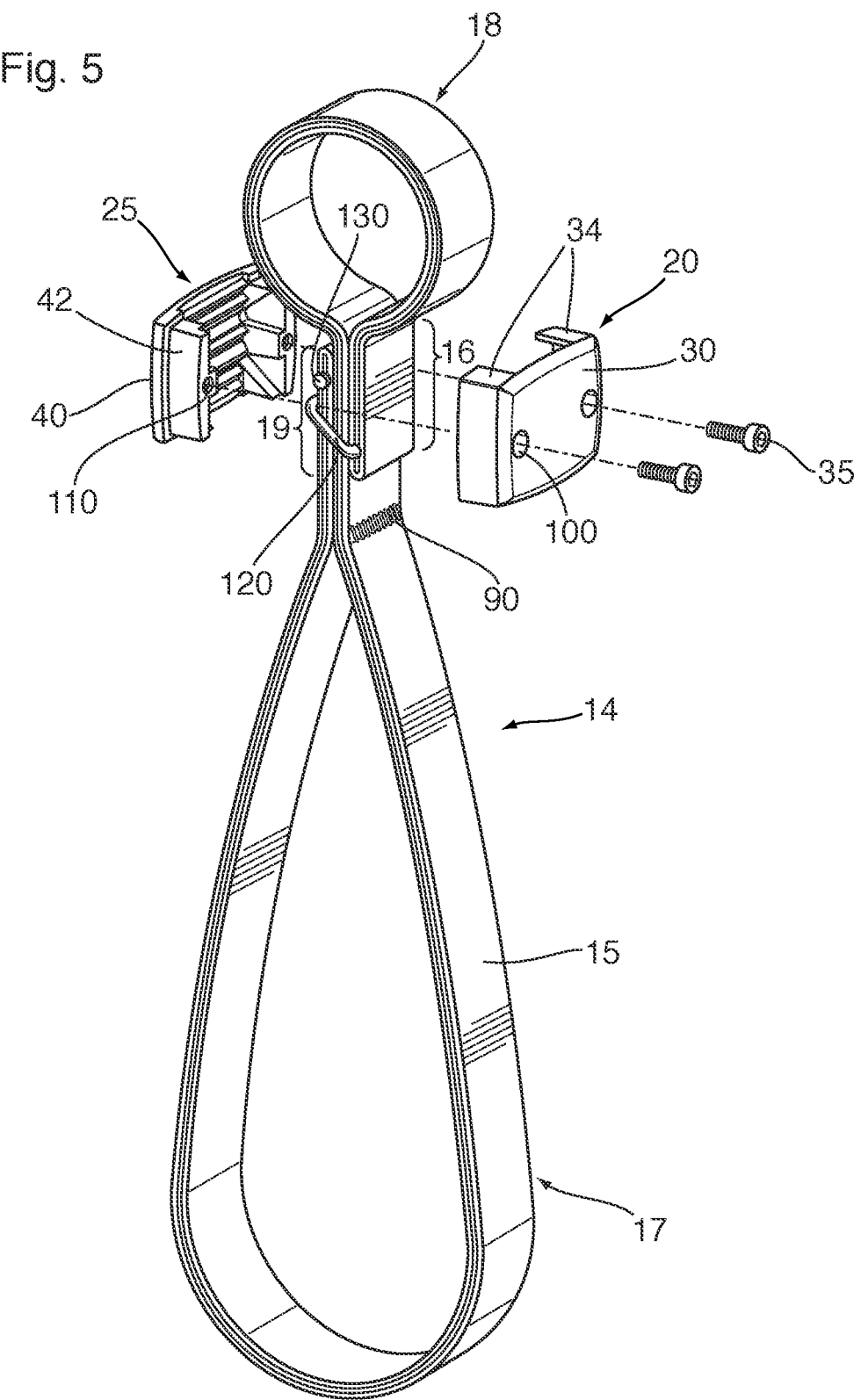
FIG. 5 is a front right exploded perspective view of the clamp of the passenger assist strap and clamp of FIG. 1.

As shown in FIGS. 1 to 4, a passenger assist strap and clamp 10 of the present invention comprises a passenger assist strap 14 and a clamp 12. The passenger assist strap 14 comprises a strap 15 which can form a bottom loop 17 and top loop 18 when folded and thereafter the clamp 12 may be secured onto it.

The passenger assist strap and clamp 10 is shown with the environment of a stanchion 60 from which it hangs when in use. The passenger assist strap and clamp 10 may be secured more tightly around the stanchion 60 than shown in FIGS. 1 to 4.

As shown in FIGS. 5, 6a and 6b, the passenger assist strap 14 has a tuck loop 120 at one end adjacent a first strap portion 16 and a pin 130 at the other end adjacent a second strap portion 19. The first strap portion 16 and second strap portion 19 are used in order to describe the invention but the straps of these portions are the same as the strap 15 generally. The tuck loop 120 and pin 130 may be sewn or otherwise joined to the strap so that they do not come loose of the strap 15. The pin 130 extends the width of the strap 15. The end portions of the pin 130 extending beyond the strap may be knobs of greater diameter than the portion of the pin 130 within the strap 15. The width of the pin 130 is greater than the inner width of the tuck loop 120.

FIG. 5 also shows the tuck loop 120 looped over the second strap portion 19, and that the first strap portion 16 and second strap portion 19 sandwich a portion of the middle of the strap 15 between them, rather than having the first strap portion 16 adjacent the second strap portion 19 as is known in the prior art. The passenger assist strap 14 may optionally have bottom loop stitching 90 added for ease of installing on stanchion 60. Sewing or otherwise creating a "permanent" bottom loop 17 is not essential but make installation on a stanchion 60 easier.

A passenger assist strap 14 comprised of a strap 15 with tuck loop 120 and pin 130 is shown in FIGS. 6a-b. The strap 15 may be made of layers sewn or otherwise adhered together, for example two layers of equal length strap sewn together at the lengthwise ends and/or glued together. The passenger assist strap 14 may be comprised of a length of strap 15 folded over to create a double thickness of strap, and the tuck loop is attached to the strap by the length of strap folding over the tuck loop, and the pin is attached to the strap by the length of the strap folding over the pin, and the double thickness of strap is secured together. In an embodiment of the passenger assist strap 14 of the present invention, there is a single layer of strap 15 that is folded over as seen in FIGS. 6a and 6b. In this example, the cut ends meeting point 137 is in or adjacent the first end portion 16 near the tuck loop 120 and cut ends stitching 138 keeps the cut ends together more securely. The tuck loop 120 and pin 130 are more secure since they are between the layers of strap 15 adjacent a folded over strap 15 rather than at cut ends of strap 15. As will be understood, the cut ends meeting point could be located at various points along the strap 15, but preferably not at the ends of the passenger assist strap 14. The layers of strap could be of different colours, patterns or design.

Figure 7A:
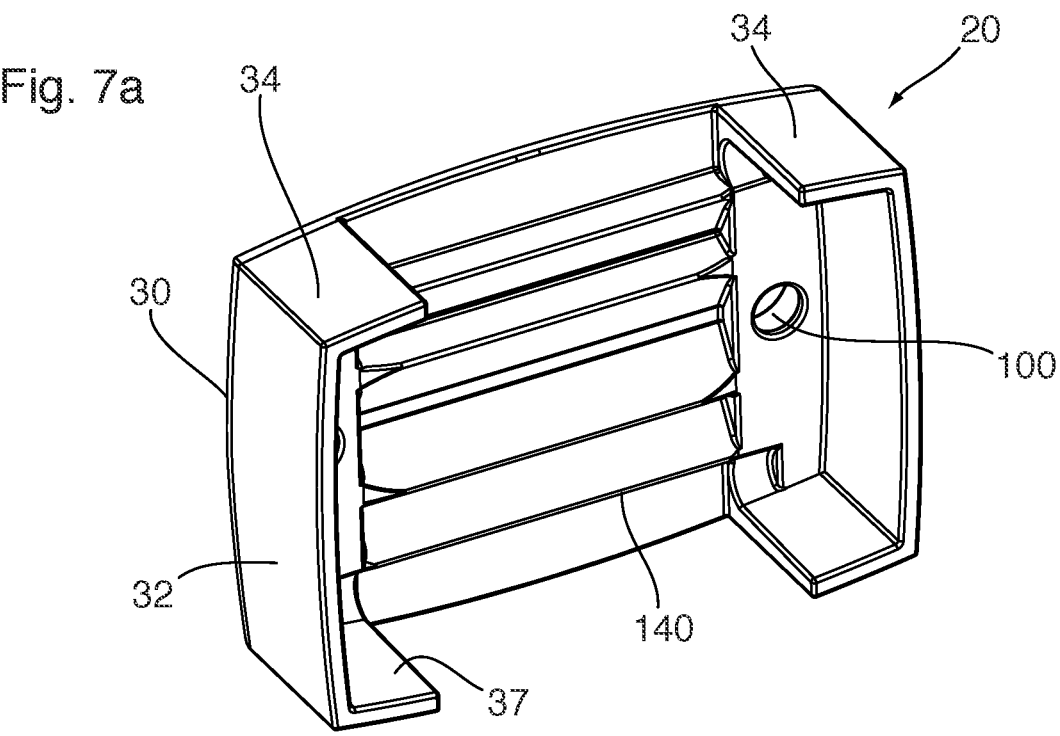
FIG. 7a is a male clamp of an embodiment of the present invention.
Figure 7B:
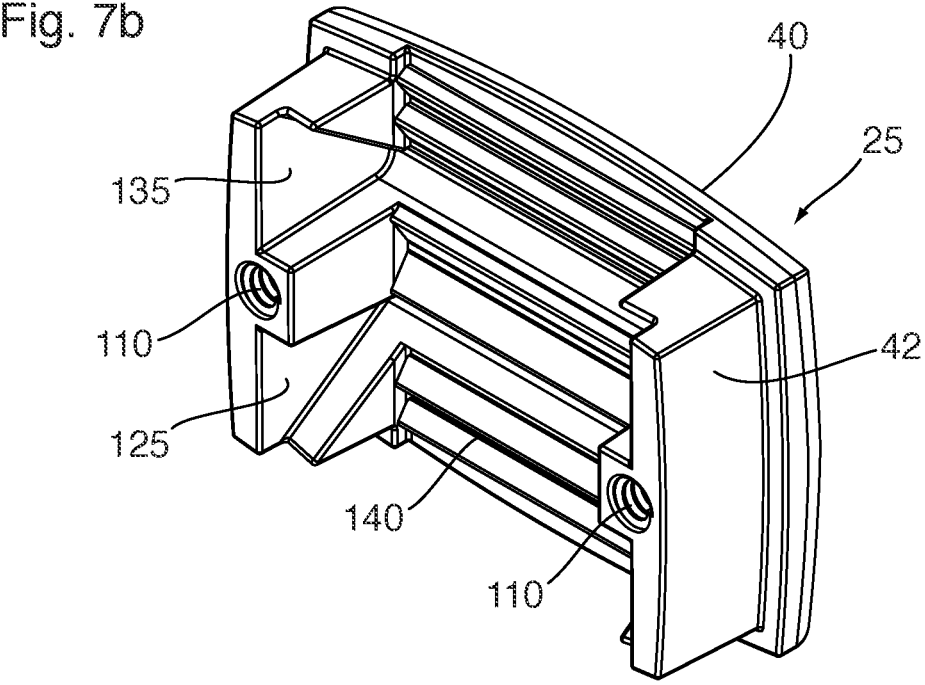
FIG. 7b is a female clamp of an embodiment of the present invention.
Figure 8A:
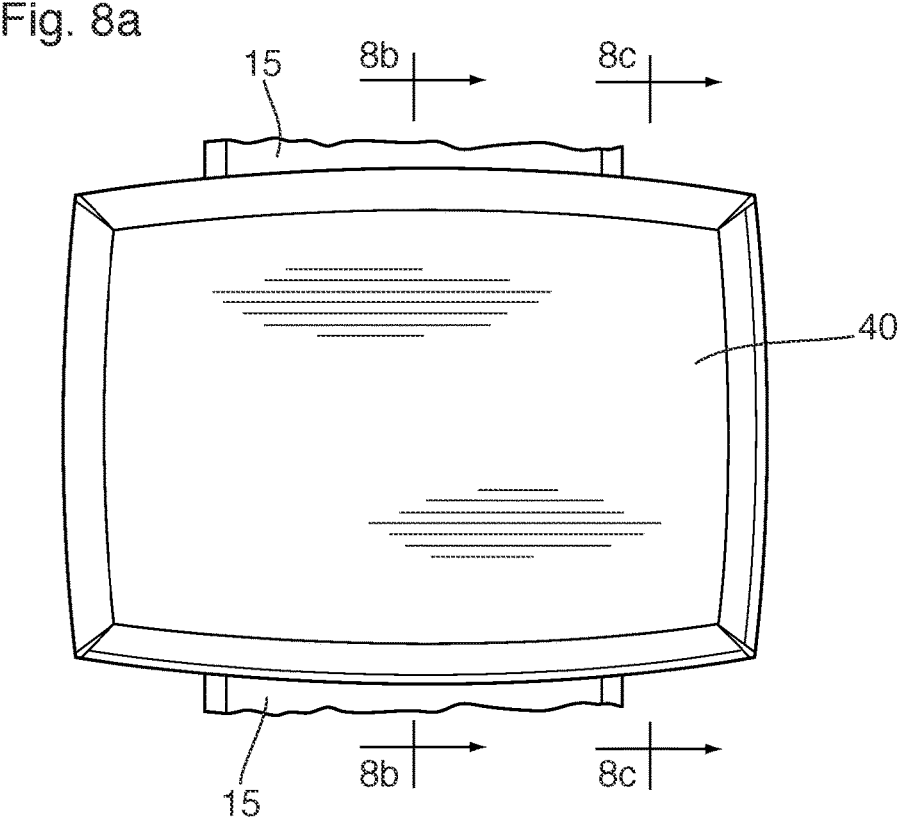
FIG. 8a is a back view of a clamp showing a portion of a strap of a passenger assist strap and clamp of an embodiment of the present invention.
Figure 8B:
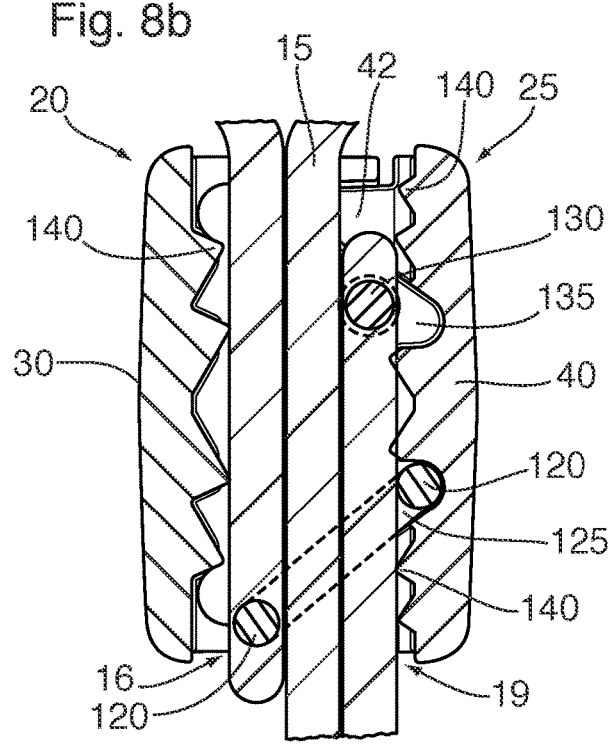
Figure 8C:
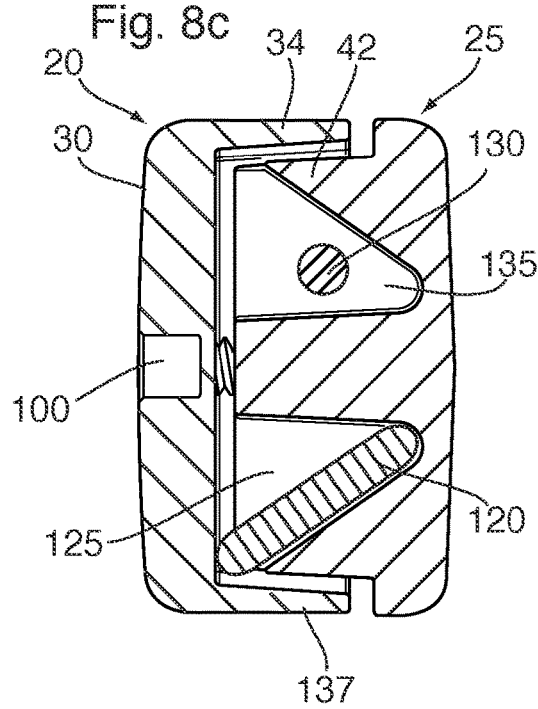
Figure 9A:
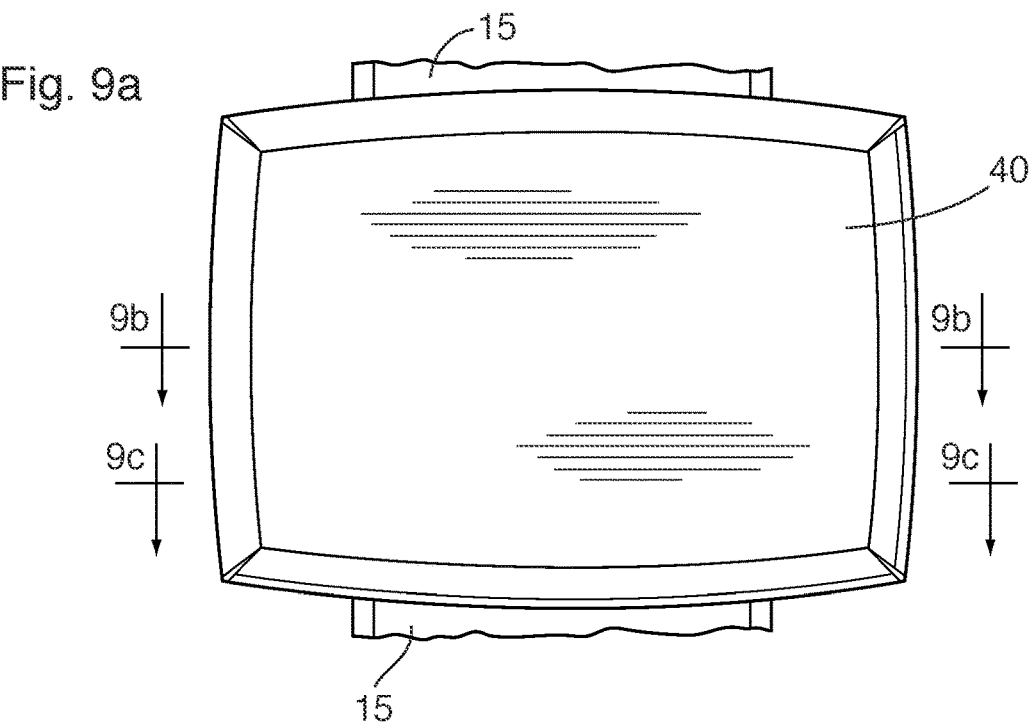
FIG. 9a is a back view of a clamp showing a portion of a strap for a passenger assist strap and clamp of an embodiment of the present invention.
Figure 9B:
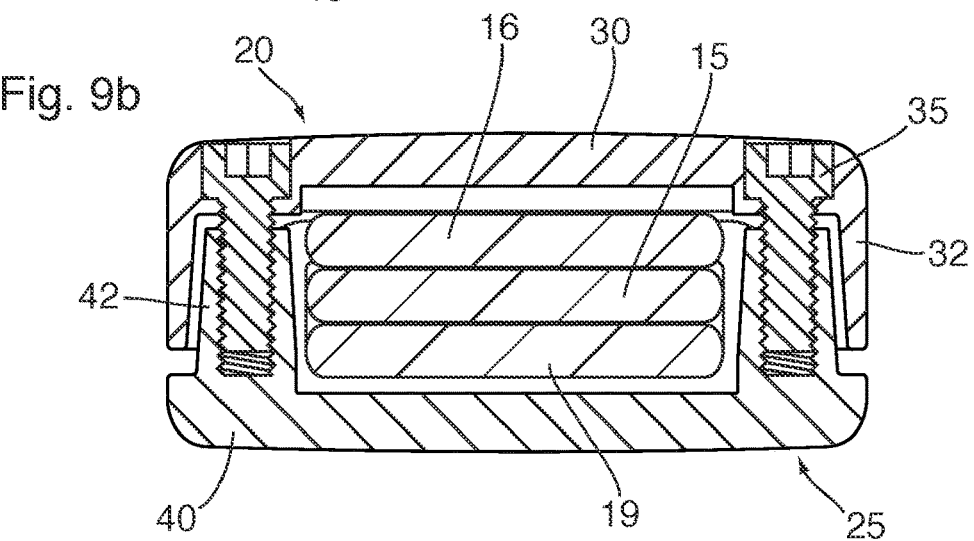
Figure 9C:
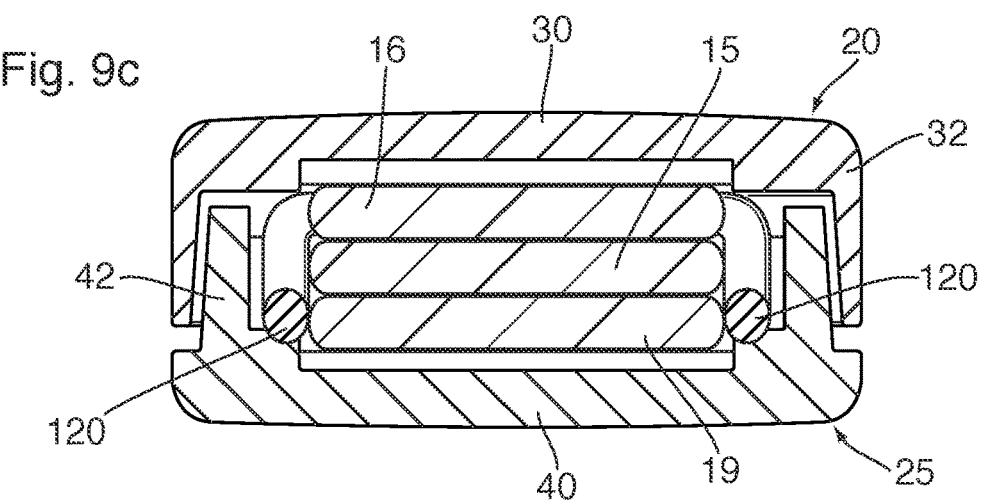
Figure 10A:
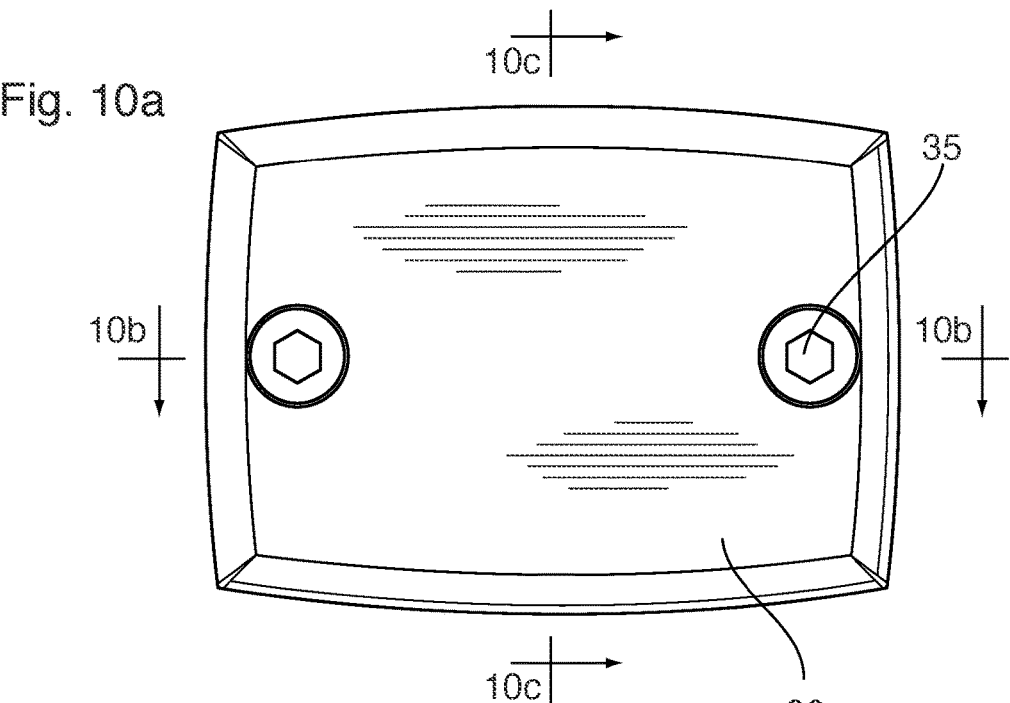
FIG. 10a is a front view of a clamp for a passenger assist strap and clamp of an embodiment of the present invention.
Figure 10B:
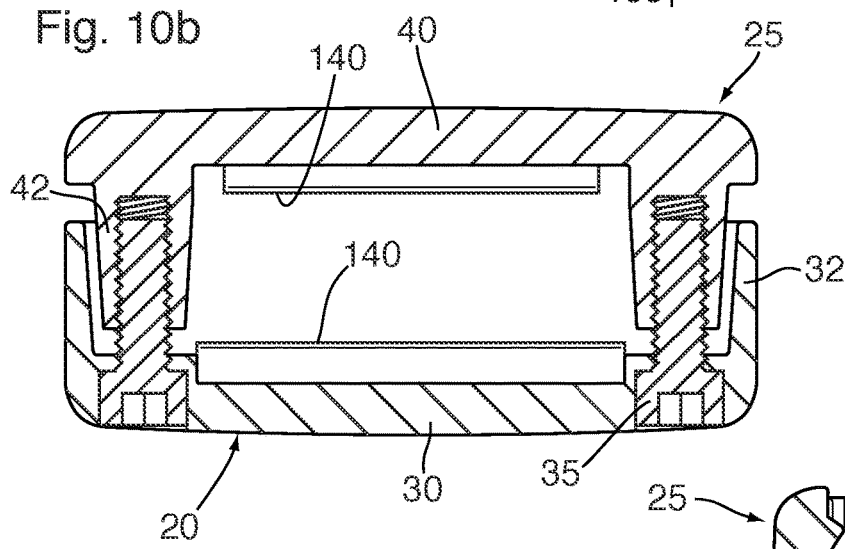
Figure 10C:
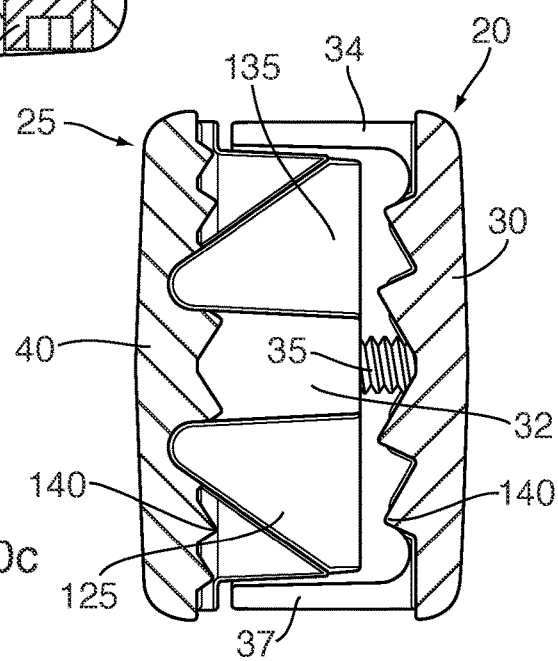

As shown in FIGS. 1 to 5, 7a and 7b, the clamp 12 is comprised of a male clamp 20, screws 35 and a female clamp 25. The male clamp 20 has a male clamp face 30, male clamp sides 32, male clamp top sections 34 and (as shown in FIG. 7a) a male clamp bottom sections 37. The male clamp top sections 34 and male clamp bottom sections 37 provide aesthetic appeal and tamper proofing. The female clamp 25 has a female clamp face 40 and female clamp sides 42.

As shown in FIG. 5, the male clamp face 30 has holes 100 for the screws 35 to pass through, and the female clamp sides 42 have corresponding ports 110 for the screws 35 to screw into. The screws do not pass through the strap 15 but rather secure the clamp together on the outside of the strap 15. It will be understood that other means may be used to join the male clamp 20 to the female clamp 25, such as a custom mechanical locking system between the male and female clamps, adhesives, cable ties, fasteners, etc. The female clamp sides 42 are shown in FIG. 5 but are covered by the male clamp sides 32 in FIGS. 1 to 4.

The passenger assist strap 14 is folded or looped as shown in FIG. 5 and then the clamp 12 is attached to the passenger assist strap 14 by passing the screws 35 through the holes 100 into the ports 110 to join the male clamp 20 to female clamp 25. The clamp 12 is clamped over the first end portion 16 and second end portion 19 of the strap 15.

The inside of the clamp 12 is specially tooled to hold the passenger assist strap 14. As shown in FIGS. 8a to 10c the female clamp 25 has a V shaped groove comprising tuck loop groove 125 and pin groove 135 formed into the inside of each of the female clamp sides 42 to hold the tuck loop 120 and the end portions of the pin 130, respectively. The female clamp 25 covers the second end 19 portion of the strap 15 and the end portions of the pin 130 slide down into the pin groove 135 and the tuck loop 120 slides up into the tuck loop groove 125. The clamp 12 is held in place by the tuck loop 120 in the tuck loop groove 125 and the end portions of the pin 130 in the pin groove 135. Optionally teeth 140 on the inside of the female clamp 25 help to grip into the strap 15. The male clamp 20 covers the first end portion 16 of the strap 15 and optionally teeth 140 help to grip onto the strap 15.

Optionally below the clamp 12, the two layers of strap 15 may be sewn together below the attachment of the clamp 12 as shown at bottom loop stitching 90 which in this example is a double stitch. The bottom loop stitching 90 is positioned to provide a bottom loop 17 in a size suitable for gripping.

Given that the clamp 12 is secured with screws on either side of the strap 15, the strap 15 may be made of very strong material through which it is difficult to punch a hole. The strap may alternatively be made of material through which a hole may readily by punched but such a hole would compromise the strap's strength. The strap may be made of various materials, such as, nylon, polyester, polypropylene, carbon fiber, para-aramid fiber. The passenger assist strap 15 may be made of a strong material that can withstand wear and tear from passenger usage as well as from vandalism.

The clamp 12 may be made of high-pressure dye cast zinc or other durable material.

FIGS. 11a-c show how a passenger assist strap 14 of the present invention may be installed on a stanchion 60. In this example, the bottom loop 17 is already formed by virtue of the bottom loop stitching 90. In FIG. 11a, the passenger assist strap 14 is looped over the stanchion 60 so that the tuck loop 120 is hanging on one side of the stanchion and the bottom loop 17 is hanging on the other side of the stanchion 60. FIG. 11b shows that the bottom loop 17 is then threaded through the tuck loop 120. FIG. 11c shows that the bottom loop 17 passes through the tuck loop 120 until the tuck loop 120 abuts against the end portions of the pin 130 which prevents it from going further. This shows that even if the clamp 12 is not present or was removed, the tuck loop 120 catches behind the pin 130 to form a slip knot to hold the passenger assist strap 14 on the stanchion 60. As will be evident, a second passenger assist strap 14 could be attached to the bottom of the bottom loop 17 wherein the bottom loop 17 has the function of the stanchion 60 in FIGS. 11 a-c, thus creating an extension of the first passenger assist strap 14 on the stanchion 60.

As shown in FIG. 5, a male clamp 20 and female clamp 25 may be added to the passenger assist strap 14 on the stanchion shown in FIG. 11c when the male clamp 20 and female clamp 25 are positioned over the three layers of strap 15 and are secured to one another using screws or other fastening means, as described above.

It will be understood that the passenger assist strap 14 could be formed into the slip knot type position shown in FIG. 11c without the stanchion 60, and this would be useful for sliding onto stanchions 60 which are not already installed on a vehicle.

The configuration of the tuck loop 120 at a first strap portion 16 and a pin 130 at a second strap portion 19 permits the passenger assist strap 14 to be configured to varying sizes of stanchions as the top loop 18 may be made larger for installation on larger stanchions and smaller for installation on smaller stanchions. The length of the strap 15 can be customized to provide a larger or smaller top loop 18 and bottom loop 17 size, respectively.

In use on a stanchion 60 the bottom loop 17 is suitable for a passenger to hold, and the top loop 18 is secured around the stanchion 60. To further prevent sliding along the stanchion 60 a friction pad (not shown) may be added on the inside of the top loop 18. For aesthetic or further tamper proofing purposes the top loop 18 may be covered with a rail spool.

From the above detailed description, the operation and construction of the invention should be apparent. While there are herein shown and described example embodiments of the invention, it is nevertheless understood that various changes may be made with respect thereto without departing from the principle and scope of the invention.

We claim:

1. A passenger assist strap and clamp comprising a passenger assist strap and a clamp, wherein the passenger assist strap comprises a tuck loop, a pin having a first end portion and a second end portion, and a strap having a first end and a second end, the tuck loop is attached to the strap at the first end and the pin is attached to the strap at the second end such that the end portions of the pin extend beyond a width of the strap, the strap is folded to bring the second end of the strap adjacent a middle portion between the first end and the second end of the strap to form a bottom loop, and the bottom loop is threaded through the tuck loop until the tuck loop abuts against the end portions of the pin, and wherein the clamp comprises an interlocking male clamp and a female clamp, and wherein the male clamp attaches to the female clamp by attachment means to securely attach the clamp to the passenger assist strap such that the female clamp covers the strap where the tuck loop abuts against the end portions of the pin.

2. The passenger assist strap and clamp of claim 1, wherein the female clamp has female clamp sides each with a V-shaped groove comprising an upper pin groove along which the end portions of the pin slide into and a lower tuck loop groove along which the tuck loop slides into.

3. The passenger assist strap and clamp of claim 2, in which the attachment means comprises holes in male clamp, ports in the female clamp sides and screws which pass through the holes and screw into the ports and which screws do not pass through the strap.

4. The passenger assist strap and clamp of claim 3, in which the male clamp additionally comprises male clamp sides which cover the female clamp sides.

5. The passenger assist strap and clamp of claim 4, in which the passenger assist strap is comprised of more than one layer of strap.

6. The passenger assist strap and clamp of claim 4, wherein the strap of the passenger assist strap is comprised of a length of strap folded over to create a double thickness of strap, and the tuck loop is attached to the strap by the length of strap folding over the tuck loop, and the pin is attached to the strap by the length of the strap folding over the pin, and the double thickness of strap is secured together.

\* \* \* \* \*